US008652286B2

(12) United States Patent
Shen et al.

(10) Patent No.: US 8,652,286 B2
(45) Date of Patent: Feb. 18, 2014

(54) STRETCHABLE APPLIQUE AND METHOD FOR MAKING THE SAME

(75) Inventors: Hongqing Shen, Weymouth, MA (US); Anna E. Newton, Jamaica Plain, MA (US); Paul E. Litchfield, Westboro, MA (US); William McInnis, Westwood, MA (US)

(73) Assignee: Reebok International Limited, London (GB)

( * ) Notice: Subject to any disclaimer, the term of this patent is extended or adjusted under 35 U.S.C. 154(b) by 999 days.

(21) Appl. No.: 12/351,592

(22) Filed: Jan. 9, 2009

(65) Prior Publication Data

US 2010/0178445 A1 Jul. 15, 2010

(51) Int. Cl.
*B32B 37/00* (2006.01)
*B32B 37/12* (2006.01)

(52) U.S. Cl.
USPC ........................................ 156/250

(58) Field of Classification Search
USPC ........................................ 156/250
See application file for complete search history.

(56) References Cited

U.S. PATENT DOCUMENTS

| | | | |
|---|---|---|---|
| 4,098,938 A * | 7/1978 | Arters | 428/160 |
| 4,365,353 A | 12/1982 | Rayl | |
| 4,499,741 A | 2/1985 | Harris | |
| 4,909,769 A | 3/1990 | Paterson | |
| 5,009,943 A | 4/1991 | Stahl | |
| 5,149,388 A | 9/1992 | Stahl | |
| 5,422,173 A | 6/1995 | Stahl | |
| 5,537,939 A | 7/1996 | Horton | |
| 5,665,458 A | 9/1997 | Mahn, Jr. | |
| 5,817,393 A | 10/1998 | Stahl | |
| 5,914,176 A * | 6/1999 | Myers | 428/195.1 |
| 5,933,867 A | 8/1999 | Corder | |
| 6,194,044 B1 | 2/2001 | Stahl | |
| 6,243,877 B1 | 6/2001 | Heyward, Jr. | |
| 6,277,106 B1 * | 8/2001 | Boudry et al. | 604/394 |
| 6,752,075 B2 | 6/2004 | Ciaramitaro et al. | |
| 6,875,395 B2 * | 4/2005 | Kisha et al. | 264/482 |
| 6,955,124 B2 * | 10/2005 | Ciaramitaro et al. | 101/485 |
| 7,159,621 B2 * | 1/2007 | Shannon | 139/422 |
| 7,169,249 B1 | 1/2007 | Nordstrom | |
| 2002/0023288 A1 | 2/2002 | Garneau | |

(Continued)

FOREIGN PATENT DOCUMENTS

| | | | |
|---|---|---|---|
| CN | 1174254 A * | 2/1998 | |
| DE | 19504316 C1 * | 8/1996 | |

(Continued)

*Primary Examiner* — Philip Tucker
*Assistant Examiner* — Vicki Wu
(74) *Attorney, Agent, or Firm* — Sterne, Kessler, Goldstein & Fox P.L.L.C.

(57) ABSTRACT

A stretchable appliqué made from a stretchable substrate with indicia thereon may be applied to a variety of articles including stretchable performance athletic wear. A method for making the stretchable appliqué may include applying an adhesive and a carrier layer to one surface of a stretchable substrate. Indicia may then be applied to the opposite surface of the stretchable fabric and the stretchable substrate may be cut to a desired shape to form the stretchable appliqué. The carrier layer may then be removed and the stretchable appliqué may be adhered to the desired article. The stretchable appliqué may be adhered to stretchable articles of apparel so that the appliqué may stretch when the article of apparel stretches. The carrier layer may be less stretchable than the stretchable substrate, including being completely non-stretchable.

21 Claims, 4 Drawing Sheets

(56) References Cited

U.S. PATENT DOCUMENTS

| | | |
|---|---|---|
| 2002/0121333 A1 | 9/2002 | Sofer et al. |
| 2004/0068802 A1* | 4/2004 | Miller et al. ............... 8/115.51 |
| 2004/0221368 A1* | 11/2004 | Okot ............................ 2/171 |
| 2005/0000622 A1* | 1/2005 | Cano .......................... 156/93 |
| 2005/0086724 A1 | 4/2005 | Marsh et al. |
| 2005/0090928 A1 | 4/2005 | Gibson |
| 2005/0188447 A1* | 9/2005 | Gray ............................ 2/115 |
| 2005/0251894 A1 | 11/2005 | Marsh et al. |
| 2005/0279445 A1 | 12/2005 | Shemanski et al. |
| 2006/0277658 A1 | 12/2006 | Marsh et al. |
| 2008/0138599 A1* | 6/2008 | Gao et al. .................... 428/221 |
| 2008/0248704 A1* | 10/2008 | Mathis et al. ............... 442/102 |
| 2009/0025123 A1* | 1/2009 | Weedlun et al. ............... 2/244 |
| 2009/0126413 A1* | 5/2009 | Sorensen et al. ............ 66/196 |

FOREIGN PATENT DOCUMENTS

| | | | |
|---|---|---|---|
| JP | 59226083 A | * | 12/1984 |
| JP | 09187802 A | * | 7/1997 |
| JP | 2004299284 A | * | 10/2004 |
| WO | WO 2007103168 A2 | * | 9/2007 |

* cited by examiner

STRETCHABLE APPLIQUE AND METHOD FOR MAKING THE SAME

BACKGROUND OF THE INVENTION

1. Field of the Invention

The present invention is directed to a stretchable appliqué and a method for making a stretchable appliqué.

2. Background Art

It is well known for a variety of types of apparel to have one or more appliqués bearing a logo or other indicia, such as numbers, letters, or crests. In the past, appliqués such as those for athletic jerseys have been formed of multiple fabric layers and then stitched or sewn onto an item of apparel. Traditionally, appliqués have been made from twill fabric and other relatively heavy and rigid woven fabrics. Such appliqués tend to be heavy and bulky and sewing or stitching them onto an item of apparel can be a time consuming process.

Recently, it has become popular for apparel to be made from lightweight, stretchable fabric, particularly in performance apparel for athletes. When applied to such apparel, traditional appliqués can encumber the underlying garment and can hinder the wearer's movement during use. Accordingly, there is a need in the art to develop innovative appliqués, manufacturing processes, and manners of attachment more suitable for such apparel.

BRIEF SUMMARY OF THE INVENTION

In one embodiment, a method for making a stretchable appliqué includes providing a stretchable substrate having a first surface and a second surface opposite the first surface, adhering the first surface of the stretchable substrate to a carrier layer with an adhesive, applying at least one indicium on the second surface of the stretchable substrate, and cutting the stretchable substrate to form a stretchable appliqué of a desired shape. The carrier layer is less stretchable than the stretchable substrate. At least one of the steps of applying the at least one indicium and cutting the stretchable substrate is performed while the carrier layer is adhered to the first surface of the stretchable substrate.

In another embodiment, a method for making a stretchable appliqué includes adhering a first surface of a stretchable substrate having the first surface and a second surface opposite the first surface to a carrier layer with an adhesive, applying at least one indicium on the second surface of the stretchable substrate while the carrier layer is adhered to the first surface of the stretchable substrate, and cutting the stretchable substrate while the carrier layer is adhered thereto to form a stretchable appliqué of a desired shape.

In another embodiment, a stretchable appliqué includes a stretchable substrate having a first surface and a second surface opposite the first surface, an adhesive layer adjacent the first surface of the stretchable substrate, a carrier layer adjacent the adhesive layer wherein the adhesive layer is between the stretchable substrate and the non-stretchable carrier layer and the carrier layer is less stretchable than the stretchable substrate, and at least one indicium on the second surface of the stretchable substrate.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

The present invention will be described with reference to the accompanying drawings. While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Figure 1:
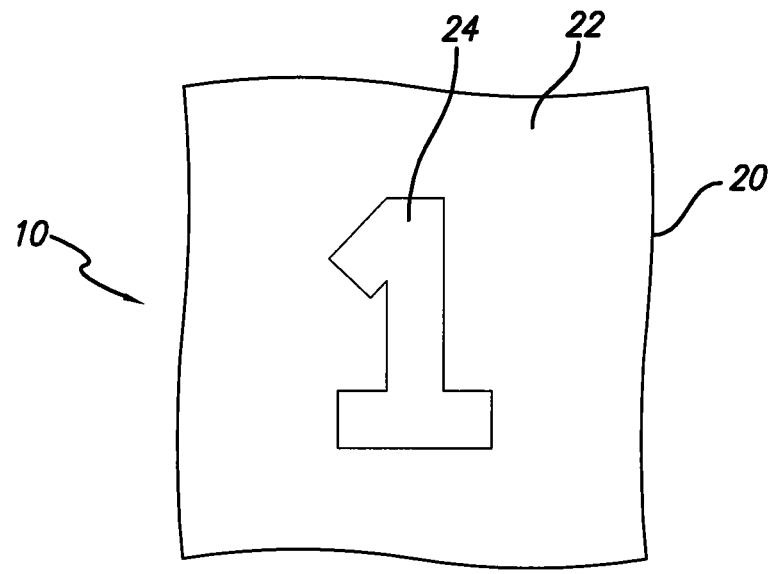
FIG. 1 is an exemplary appliqué according to an embodiment of the present invention.
Figure 2:
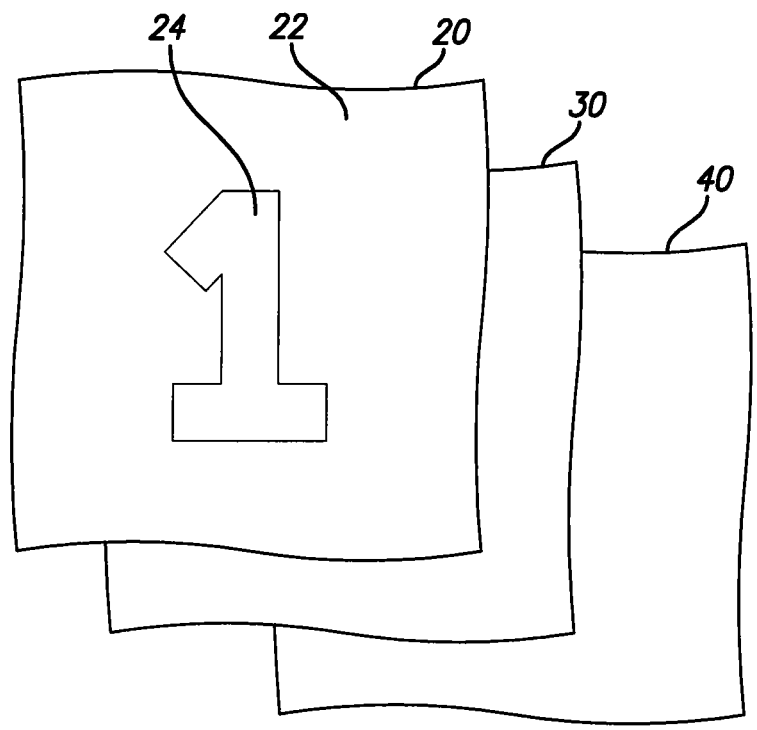
FIG. 2 is an exploded view of the appliqué of FIG. 1 according to an embodiment of the present invention.

In one embodiment, as shown in FIGS. 1 and 2, an appliqué 10 may be made from a stretchable substrate 20. In one embodiment, appliqué 10 may comprise a single substrate layer in order to provide a more lightweight and flexible appliqué. In other embodiments, appliqué 10 may comprise multiple substrate layers. Stretchable substrate 20 may have a front surface 22 and an opposing back surface (not shown) wherein front surface 22 may have one or more indicium 24 applied thereto. Indicium 24 may comprise a logo, a crest, a letter, a number, an emblem, a picture, a photograph, or other desirable design. Substrate 20 can include, but is not limited to, woven fabric; non-woven fabric; knitted fabric; felted fabric; a film or a membrane such as a polymer film or membrane, or combinations thereof. Substrate 20 can include natural or synthetic material, or a combination thereof. In some embodiments, substrate 20 includes a polyolefin, nylon, polyurethane, or rubber such as a polyolefin, nylon, polyurethane, or rubber film or membrane. In some embodiments, substrate 20 includes perforations. In preferred embodiments, stretchable substrate 20 is stretchable under tension and can substantially recover its shape and size when tension is removed. In some embodiments, stretchable substrate 20 is a fabric such as a stretchable fabric with a high recoverability.

The back surface of stretchable substrate 20 may have an adhesive 30 applied thereon for attaching appliqué 10 to an article, for example, an article of apparel. In some embodiments, the stretchability of appliqué 10 may make it particularly suitable for attaching to an article of apparel made from a stretchable material, as appliqué 10 may stretch with the article of apparel. This may be an advantage over prior appliqués because when the article of apparel stretches but an appliqué does not, the attachment means can be weakened, increasing the likelihood that the appliqué will detach. Accordingly, having appliqué 10 able to stretch with the article of apparel to which it is attached, may increase the durability of appliqué 10 and/or minimize the likelihood that appliqué 10 will become detached. Furthermore, when appliqué 10 is attached to stretchable and recoverable athletic apparel, the apparel can better accommodate the wearer's movements as compared to when traditional appliqués are used on a garment. In addition, use of appliqué 10 on apparel can reduce misplacement or shifting relative to underlying protective equipment (e.g., protective pads) as compared to apparel with traditional appliqués. For example, appliqué 10 can be less likely to snag or hinder the movement of protective equipment underlying the apparel than traditional, bulky and rigid, appliqués.

Figure 3:
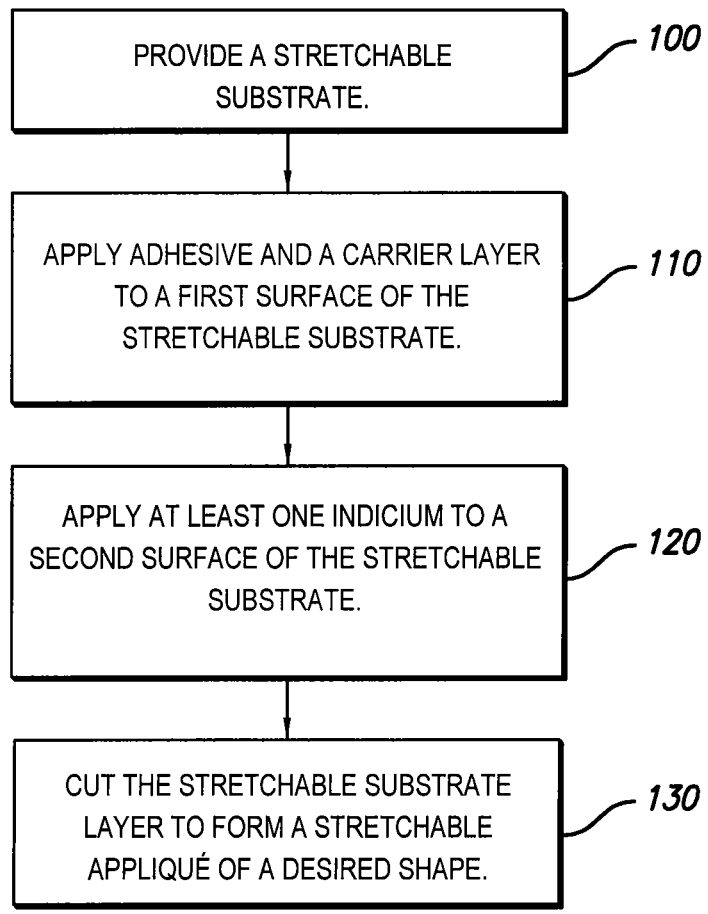
FIG. 3 is a flowchart of an exemplary method for making an appliqué according to an embodiment of the present invention.
Figure 4:
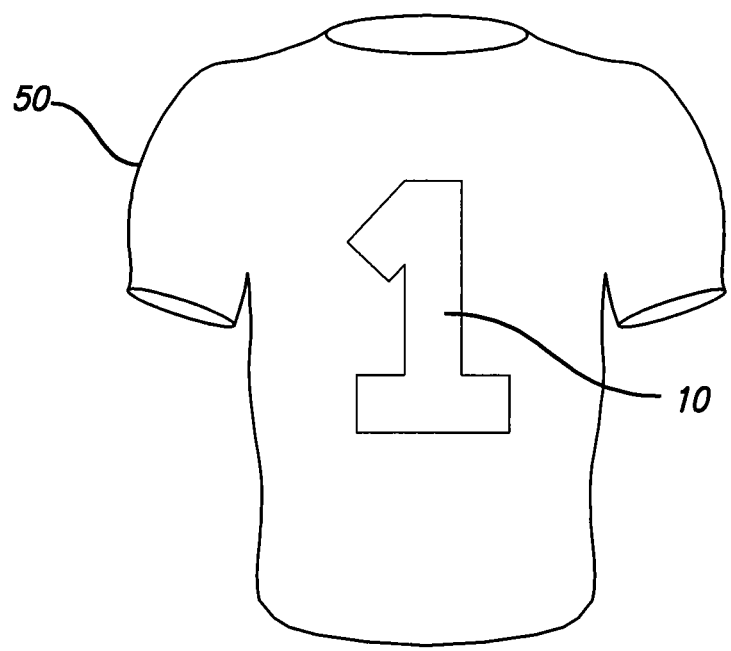
FIG. 4 is an exemplary article with an exemplary appliqué attached thereto according to an embodiment of the present invention.

In one embodiment, appliqué 10 is made according to the method outlined in the flowchart of FIG. 3. In a step 100, stretchable substrate 20 is provided. Stretchable substrate 20 may be preshrunk. For example, a stretchable fabric substrate can be preshrunk by heating the stretchable substrate in a range from about 300 degrees Fahrenheit to about 400 degrees Fahrenheit.

Next, in a step 110, adhesive 30 and a carrier layer 40 are applied to the back surface of stretchable substrate 20 so that carrier layer 40 is adhered to the back surface of stretchable substrate 20 through adhesive 30. Adhesive 30 may include a film, coating, spray, or extrusion and may be applied first to the back surface of stretchable substrate 20 and then carrier layer 40 is applied thereover. Alternatively, adhesive 30 is applied first to carrier layer 40 and then both are applied to the back surface of stretchable substrate 20. If adhesive layer 30 is a preformed film, it may be laminated to stretchable substrate 20 or carrier layer 40 with the application of sufficient heat and pressure. In some embodiments, adhesive layer 30 includes a perforated adhesive film. Alternatively, adhesive layer 30 may be extruded directly onto stretchable fabric 20 or carrier layer 40. A suitable adhesive material may be stretchable and may have stretch properties substantially similar to that of stretchable substrate 20. During formation of this appliqué laminate comprising stretchable substrate 20, adhesive 30, and carrier layer 40, stretchable substrate 20 may be in a tensioned, compressed, or relaxed state. Preferably, stretchable substrate 20 is relaxed or slightly tensioned so that carrier layer 40 holds stretchable substrate 20 in a relaxed or slightly tensioned state during processing of the appliqué laminate.

A suitable material for carrier layer 40 may be non-stretchable and easily removable from adhesive 30, such as, for example, a paper backing. Non-stretchable carrier layer 40 stabilizes stretchable fabric 20 during processing to minimize or prevent substantial distortion or stretching of stretchable fabric 20 during processing. Other suitable materials for carrier layer 40, including, but not limited to, non-stretchable fabrics, films, membranes, webbings, foils, and combinations thereof may be used. Generally, carrier layer 40 should have a Substrate Stretch (as described infra) less than the Substrate Stretch of stretchable substrate 20 so that carrier layer 40 is less stretchable than substrate 20.

In a step 120, indicium or indicia 24 is applied to front surface 22 of stretchable substrate 20. Indicia 24 may be applied using nearly any technique known in the art including, but not limited to, printing including sublimation printing, screen printing, letterpress printing, gravure printing, thermal printing, offset printing, electrostatic printing, or inkjet printing; flocking; etching; embossing; debossing; cutting; burning including burn out, laser burning, or chemical burning; lasering including laser etching; stitching; embroidering; stenciling; spraying; painting; or combinations thereof. In one embodiment, digital sublimation printing may be used. The indicium application process may include determining the style, such as the font, for indicium 24 that is a number or letter, or the graphic design for indicium 24 that is a logo or other design. The indicium application process may also include applying cutting lines and registration marks on front surface 22 of stretchable substrate 20 to allow for precise cutting. While FIGS. 1 and 2 show a single indicium 24 printed on stretchable substrate 20, this is merely exemplary. Several indicia 24 may be printed on stretchable substrate 20, which are subsequently cut and placed on separate articles or different areas of the same article.

In a step 130, stretchable substrate 20 is cut to form stretchable appliqué 10 of a desired shape. Cutting may be accomplished using a variety of conventional techniques including, but not limited to, laser cutting, die cutting, or knife cutting. In some embodiments, step 130 may occur while carrier layer 40 is adhered to stretchable substrate 20. In such an embodiment step 130 may include cutting just stretchable substrate 20 and adhesive 30 or alternatively, step 130 may also include cutting carrier layer 40.

The order of steps shown in FIG. 3 is merely exemplary and the steps may be carried out in a variety of combinations. For example, step 130 of cutting stretchable substrate 20 may occur before step 120 of applying indicium 24. Preferably, indicium 24 is applied to stretchable substrate 20 while adhered to a carrier layer 40 that is non-stretchable or has a stretch less than stretchable substrate 20 and stretchable substrate 20 is cut while adhered to carrier layer 40 because stretchable fabrics may be difficult to manipulate and hold during application of indicia or during cutting as a result of the fabric being easily distorted or stretched during either process. Since carrier layer 40 is less stretchable than stretchable substrate 20, or even non stretchable, it minimizes or prevents stretchable substrate 20 from stretching or otherwise being distorted while adhered thereto. This may be important because the printing and cutting of stretchable fabric appliqués requires an accuracy that is not necessary for printing or cutting stretchable fabrics for some other garments. If the stretchable fabric is not carefully held during printing and cutting, the appliqué (or the indicia thereon) can distort or shrink or the cuts can be uneven or irregular. In other garment applications, some degree of imprecision can be permitted (e.g., cut imprecision) since the imprecision can be accommodated in a seam (e.g., folded under). However, when a single layer appliqué is cut and sealed to a garment, there are no seams in which cut variability can be accommodated.

As noted above, the order of steps shown in FIG. 3 is merely exemplary. In one embodiment, the order of steps may be providing stretchable substrate 20 (step 100), then applying adhesive 30 and carrier layer 40 to first surface 22 of stretchable substrate 20 (step 110), then applying at least one indicium to the second surface of stretchable substrate 20 (step 120), and then cutting stretchable substrate 20 (step 130). In another embodiment, the order of steps may be providing stretchable substrate 20 (step 100), then applying adhesive 30 and carrier layer 40 to first surface 22 of stretchable substrate 20 (step 110), then cutting stretchable substrate 20 (step 130), and then applying at least one indicium to the second surface of stretchable substrate 20 (step 120). In a further embodiment, the order of steps may be providing stretchable substrate 20 (step 100), then applying at least one indicium to the second surface of stretchable substrate 20 (step 120), then applying adhesive 30 and carrier layer 40 to first surface 22 of stretchable substrate 20 (step 110), and then cutting stretchable substrate 20 (step 130). In yet another embodiment, the order of steps may be providing stretchable substrate 20 (step 100), then cutting stretchable substrate 20 (step 130), then applying adhesive 30 and carrier layer 40 to first surface 22 of stretchable substrate 20 (step 110), and then applying at least one indicium to the second surface of stretchable substrate 20 (step 120).

available from Everest of China. The properties of these four fabrics may be found below in Table 1 and are referred to by the name of the supplier.

TABLE 1

| Material and Supplier | Content | Weight (gsm) | Thickness (mm) | Bursting Strength (%) | Wale Stretch (%) | Course Stretch (%) | Wale Growth (%) | Course Growth (%) |
|---|---|---|---|---|---|---|---|---|
| Knit Fabric 11220 from Tong Siang | 50% polyester; 50% PBT | 168 | 0.52 | 8.2 | 61.25 | 37.7 | 2.36 | 5.8 |
| Knit Fabric 12250 from Fu Hsun | 81% polyamide; 19% elastane | 190 | 0.63 | 5.2 | 71 | 71 | 2.9 | 5.81 |
| Knit Fabric 15260 from New Wide | 72% polyamide; 28% elastane | 144 | 0.33 | 3.0 | 122 | 100 | 0.66 | 0.79 |
| Woven Fabric from Everest | 86% polyamide; 14% elastane | 140 | 0.3 | 6.7 | 27 | 27 | 0.52 | N/A |

It is also possible for one or more of the steps shown in FIG. 3 to be optional. In one embodiment, step 130 of cutting stretchable substrate 20 may be optional in a method for making a stretchable appliqué. For example, a stretchable appliqué may be made by applying adhesive 30 and carrier layer 40 to first surface 22 of stretchable substrate 20 and then applying at least one indicium to the second surface of stretchable substrate 20 without any cutting. In another embodiment, step 120 of applying at least one indicium may be optional in a method for making a stretchable appliqué. For example, a stretchable appliqué may be made by applying adhesive 30 and carrier layer 40 to first surface 22 of stretchable substrate 20 and then cutting stretchable substrate 20 without any application of at least one indicium thereto.

Figure 5:
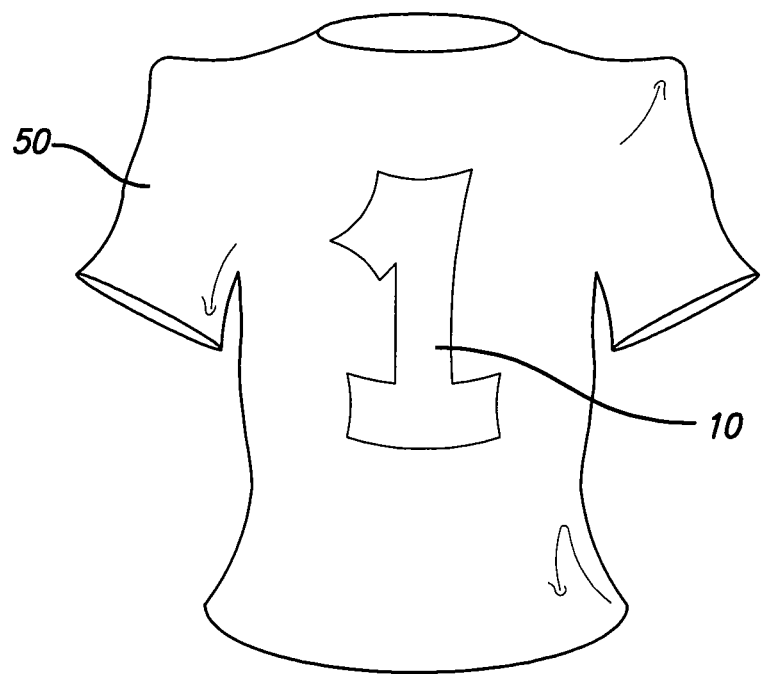
FIG. 5 is a view of the exemplary article of FIG. 4 in a stretched state.
Figure 6:
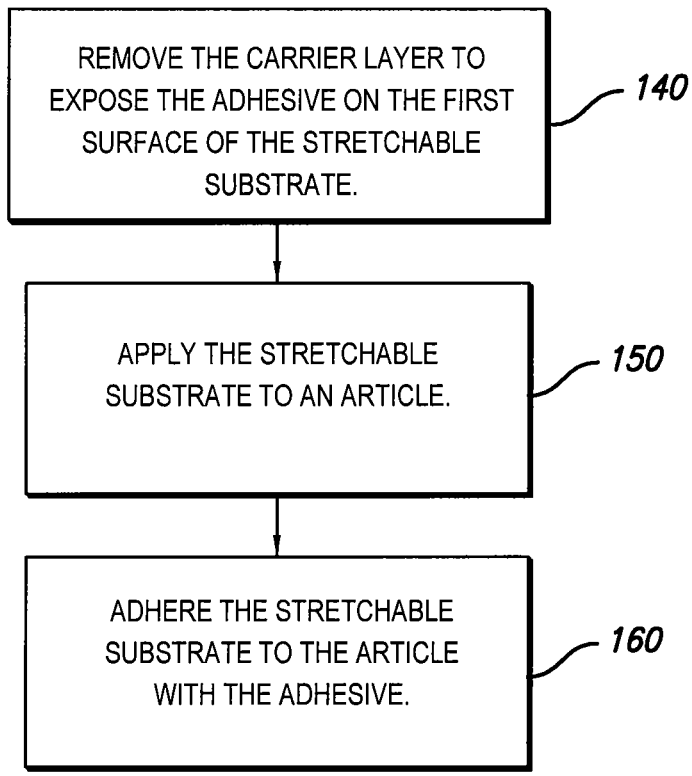
FIG. 6 is a flowchart of an exemplary method for applying an appliqué to an article according to an embodiment of the present invention.

The steps outlined in the flowchart of FIG. 3 are not limiting and additional steps may be included. For example, with reference to FIG. 6, after cutting stretchable substrate 20, carrier 40 may be removed in a step 140, thereby exposing adhesive 30 on the back surface of stretchable fabric 20. Appliqué 10 may then be applied to an article such as, for example, a shirt 50 in a step 150. Subsequently, appliqué may be adhered to shirt 50 in a step 160 utilizing adhesive 30, for example through conventional heating means, such as, for example, heat sealing or radio frequency (RF) welding. In alternative embodiments, appliqué 10 may be stitched to an article. Shirt 50 is merely exemplary and appliqué 10 may be adhered to a variety of articles including, but not limited to, an article of apparel or an article of footwear. As shown in FIG. 5, shirt 50 is also made from a stretchable fabric and when shirt 50 is stretched, appliqué 10 stretches with shirt 50.

As described above, substrate 20 can include, but is not limited to, woven fabric; non-woven fabric, knitted fabric, felted fabric, films, membranes, and combinations thereof. Preferably substrate 20 is lightweight, has high stretch, and has low growth (i.e., high recovery). Suitable fabrics for use as stretchable substrate 20 include, but are not limited to, Knit Fabric 11220 available from Tong Siang of Thailand, Knit Fabric 12250 available from Fu Hsun of China, Knit Fabric 15260 available from New Wide of China, and a woven fabric To determine the stretch of a substrate, the substrate is hung with no load attached and a distance ($A_1$) is measured between two benchmarks on the substrate. A ten pound force is then applied to the bottom of the substrate and the distance ($D_1$) between the two benchmarks is measured. Substrate Stretch is measured as a percentage and is determined by the following formula:

$$\text{Substrate Stretch} = 100 \times [(D_1 - A_1)/A_1]$$

A completely non-stretchable substrate would have a 0% Substrate Stretch.

In one embodiment, stretchable substrate 20 may have a Substrate Stretch of at least about 5%, at least about 10%, at least about 15%, at least about 20%, or at least about 25% in at least one direction. For example, in some embodiments, stretchable substrate 20 has a Substrate Stretch from about 5% to about 150%, from about 10% to about 150%, from about 15% to about 150%, from about 20% to about 150%, or from about 25% to about 150% in at least one direction. In some specific embodiments, stretchable substrate 20 has a Substrate Stretch from about 25% to about 125% in at least one direction. In other specific embodiments, stretchable substrate 20 has a Substrate Stretch from about 25% to about 125% in two perpendicular directions. In some embodiments, the methods described herein can be useful for making appliqué 10 from stretchable substrate 20 having a Substrate Stretch of more than about 150%, more than about 300%, more than about 500%, or more than about 700%.

Generally, carrier layer 40 should have a Substrate Stretch less than the Substrate Stretch of stretchable substrate 20. In some embodiments, carrier layer 40 has a Substrate Stretch of less than about 5%, less than about 2%, less than 1%, or about 0% in at least one direction. In other embodiments, carrier layer 40 has a Substrate Stretch of less than about 5%, less than about 2%, less than 1%, or about 0% in at least two perpendicular directions.

To determine the growth of a substrate, the substrate is hung with no load attached and a distance ($A_2$) is measured between two benchmarks on the substrate. Sufficient force is then applied to the bottom of the substrate to stretch the substrate a distance equal to 135% the length of the substrate and held for 2 hours. The force is then removed and the distance ($D_2$) between the two benchmarks is measured after the substrate has recovered for one hour. Substrate Growth is measured as a percentage and is determined by the following formula:

$$\text{Substrate Growth} = 100 \times [(D_2 - A_2)/A_2]$$

A completely recoverable substrate would have a 0% Substrate Growth. Alternatively, the substrate can be characterized by its Substrate Recovery in which Substrate Recovery (%)=100−Substrate Growth. A completely recoverable substrate would have a 100% Substrate Recovery.

In one embodiment, stretchable substrate 20 may have a Substrate Growth of less than about 20%, less than about 15%, less than about 10%, less than about 5%, or less than about 1% in at least one direction. For example, in some embodiments, stretchable substrate 20 has a Substrate Growth from about 0.5% to about 20%, from about 0.5% to about 15%, from about 0.5% to about 10%, from about 0.5% to about 5%, or from about 0.5% to about 3% in at least one direction. In some specific embodiments, stretchable substrate 20 has a Substrate Growth from about 0% to about 10% or from about 0% to about 5% in two perpendicular directions.

A suitable adhesive material may be stretchable and recoverable and, in one embodiment, may have stretch and recovery properties substantially similar to that of stretchable substrate 20. The adhesive can include a film, coating, spray, or extrusion. In some embodiments, the adhesive is uniformly distributed over the stretchable substrate or carrier layer, is contiguously distributed over the stretchable substrate or carrier layer, or is both uniformly and contiguously distributed over the stretchable substrate or carrier layer. In other embodiments, the adhesive is non-uniformly or non-contiguously distributed over the stretchable substrate or carrier layer. For example, the adhesive can include a pattern of adhesive over the stretchable substrate or carrier layer. In some embodiments, the adhesive material includes an outline pattern that is geometrically similar to the appliqué to be produced. In other embodiments, the adhesive includes a pattern of spaced apart adhesive material such as spots or lines of adhesive material. The adhesive can be applied over the stretchable substrate or carrier layer using any technique known in the art including, but not limited to, rolling, printing, stenciling, spraying, brushing, layering, dipping, laminating, hand lay-up and combinations thereof.

The adhesive material may have a low modulus of elasticity. In one embodiment, for example, the adhesive material may have a modulus of about 4.9N at 100% elongation for a 1.0 inch wide and 0.001 inch thick film. The adhesive material may also have a high recovery rate. In one embodiment, for example, the adhesive material may recover about 97% after 100% elongation at a rate of 12 inches per minute. The adhesive material can have a low flow index. In one embodiment, the flow index of the adhesive material is about 10 dg/min. The adhesive material may have excellent bond strength and may have a high glue line temperature, for example, in a range from about 300 degrees Fahrenheit to about 450 degrees Fahrenheit. In one embodiment, the adhesive may have a thickness in a range from about 0.001 inch to about 0.01 inch. Also a suitable adhesive may have a melting point higher than the temperatures used or generated during indicium application (e.g., printing) and/or cutting. In this manner, the appliqué package is adapted to stay together during the indicium application and/or cutting process. Suitable components for adhesive 30 may include, but are not limited to, polyurethane, nylon, polyester, polyolefin, synthetic and natural rubber, and combinations thereof. Adhesive 30 can include one or more thermoplastic polymers, thermoset polymers, heat activated adhesives, pressure-activated adhesives, glues, contact adhesives, tapes, and multi-component films. The above characteristics of a suitable adhesive are merely exemplary and suitable adhesives having one or more of these characteristic are commercially available through a number of adhesive film suppliers. Some examples of suitable adhesive films include, but are not limited to, polyurethane film nos. 3410, 3405, 3415, and 3206 available from Bemis Associates (Shirley, Mass.) and film nos. EXF-367, UAF-442 available from Adhesive Films, Inc. (Pine Brook, N.J.).

In some embodiments, the present invention provides a stretchable appliqué that may be applied to stretchable articles of apparel and is able to stretch and recover with the article of apparel to which it is attached. Thereby, the durability of appliqué and article of apparel may be increased and the likelihood that appliqué 10 will become detached may be minimized. In addition, an article of apparel that includes such a stretchable appliqué may better accommodate movement of the wearer of the stretchable article of apparel compared to a garment having a traditional appliqué. In some embodiments, the substrate of the stretchable appliqué is chosen to have substantially the same stretch and recovery characteristics of the article to which it is to be applied.

Stretchable appliqués made using the methods described herein can be lighter in weight than similarly sized traditional twill apparel appliqués. In some embodiments, stretchable appliqués made using the methods described herein can be at least about 10%, at least about 20%, or at least about 30% lighter in weight than similarly sized traditional twill apparel appliqués. For example, stretchable appliqués made using the methods described herein and using substrate materials like those listed in Table 1 can be as much as about 35% lighter in weight, or even more than 35% lighter, than similarly sized traditional twill apparel appliqués. During many activities apparel can become wet and, under those conditions, stretchable appliqués made using the methods described herein can have an even greater weight advantage when wet over similarly sized, wet traditional twill apparel appliqués. For example, stretchable appliqués made using the methods described herein and using substrate materials like those listed in Table 1 can be as much as about 40% to about 45% lighter, or even more than 45% lighter, in weight when wet as compared to similarly sized, wet traditional twill apparel appliqués.

The stretchable appliqués described herein can be applied to a variety of articles including, but not limited to, apparel including shirts, pants, shorts, leggings, tights, jackets, hats, gloves, socks, accessories; jerseys, and uniforms; signs; banners; flags; billboards; trucks, trains, buses, and automobiles; wall paper, flooring, home furnishings; athletic equipment; bags; and generally any article that includes a stretchable material or that could otherwise benefit from application of a stretchable appliqué. In preferred embodiments, the stretchable appliqué is able to stretch and recover with the article to which it is attached. In some embodiments, the stretchable appliqué can conform better to the topography of the article to which it is attached as compared to traditional appliqués.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for making an article of apparel having a stretchable appliqué comprising the following steps:
    providing a stretchable substrate having a first surface and a second surface opposite the first surface, wherein the stretchable substrate is selected from the group consisting of polyolefin, polyamide, polyester, polyurethane, elastane, rubber, and combinations thereof;
    adhering the first surface of the stretchable substrate to a stretchable carrier layer with an adhesive, wherein the carrier layer is less stretchable than the stretchable substrate;
    applying at least one indicium to the second surface of the stretchable substrate;
    cutting the stretchable substrate to form a stretchable appliqué of a desired shape;
    removing the carrier layer from the adhesive layer after cutting the stretchable substrate; and
    adhering the stretchable appliqué to an article of apparel with the adhesive layer,
    wherein at least one of the steps of applying at least one indicium and cutting the stretchable substrate is performed wile the carrier layer is adhered to the first surface of the stretchable substrate, and
    wherein the stretchable appliqué has substantially the same stretch and recovery characteristics as the article of apparel.

2. The method of claim 1, wherein the stretchable substrate is as fabric.

3. The method of claim 1, wherein the stretchable substrate has a substrate stretch of at least about 5% in one direction.

4. The method of claim 1, wherein the stretchable substrate has a substrate growth of less than about 15%.

5. The method of claim 1, wherein the adhesive is a film.

6. The method of claim 5, wherein the adhesive film is applied to the first surface of the stretchable substrate and then the carrier layer is applied to the adhesive film.

7. The method of claim 5, wherein the adhesive film is applied to the carrier layer and then the adhesive film, with the carrier layer is applied to the stretchable substrate.

8. The method of claim 1, wherein the adhesive comprises a stretchable adhesive film.

9. The method of claim 8, wherein the adhesive has substantially the same stretchability characteristics as the stretchable substrate.

10. The method of claim 1, wherein the carrier is removably adhered to the stretchable substrate.

11. The method of claim 1, wherein the step of applying at least one indicium comprises the step of printing at least one indicium on the second surface of the stretchable substrate.

12. The method of claim 11, wherein the at least one indicium is printed using sublimation printing.

13. The method of claim 1, wherein the at least one indicium is applied to the second surface of the stretchable substrate while the carrier layer is adhered to the stretchable substrate.

14. The method of claim 1, wherein the step of cutting the stretchable substrate includes cutting the adhesive and the carrier layer.

15. The method of claim 1, wherein the stretchable substrate is cut by laser cutting.

16. A method for making a stretchable appliqué comprising the following steps:
    adhering a first surface of a stretchable substrate having the first surface and a second surface opposite the first surface to a carrier layer with an adhesive, wherein the carrier layer is less stretchable than the stretchable substrate;
    applying at least one indicium to the second surface of the stretchable substrate while the carrier layer is adhered to the first surface of the stretchable substrate; and
    cutting the stretchable substrate after applying the at least one indicium to the second surface of the stretchable substrate while the carrier layer is adhered thereto to form a stretchable appliqué of a desired shape,
    wherein the stretchable substrate is selected from the group consisting of polyolefin, polyamide, polyester, polyurethane, elastane, rubber, and combinations thereof.

17. The method of claim 16, wherein the carrier layer is non-stretchable.

18. The method of claim 1, wherein the carrier layer is less stretchable than the stretchable substrate in at least two perpendicular directions.

19. The method of claim 17, wherein the non-stretchable carrier layer is paper.

20. The method of claim 1, wherein the stretchable substrate is a combination of polyamide and elastane.

21. The method of claim 16, wherein the stretchable substrate is selected from the group consisting of polyolefin, polyamide, polyester, polyurethane, rubber, and combinations thereof.

* * * * *